United States Patent [19]
LoMaglio

[11] 4,356,053
[45] Oct. 26, 1982

[54] EDGE SEALING OF LAMINATE
[75] Inventor: Lewis C. LoMaglio, Baton Rouge, La.
[73] Assignee: Ethyl Corporation, Richmond, Va.
[21] Appl. No.: 262,598
[22] Filed: May 11, 1981
[51] Int. Cl.³ .............. B32B 31/00; B31F 1/00; B32B 17/00; B29C 17/02
[52] U.S. Cl. .................... 156/499; 156/582; 156/202; 156/107; 425/366; 264/285
[58] Field of Search ............ 156/82, 292, 555, 107, 156/213, 383, 212, 274, 202, 482, 216, 217, 438, 497, 467, 468, 478, 499, 582; 100/158 R; 425/366, 374, 363; 264/285

[56] References Cited
U.S. PATENT DOCUMENTS

| | | | |
|---|---|---|---|
| 1,476,807 | 12/1923 | Evans et al. | 156/482 |
| 1,498,532 | 6/1924 | Ambler | 156/213 |
| 1,748,264 | 2/1930 | Wikle | 156/438 |
| 2,342,261 | 2/1944 | Foerch et al. | 156/202 |
| 2,709,475 | 5/1955 | Steckel et al. | 425/366 |
| 3,690,995 | 9/1972 | Loy | 156/478 |
| 3,978,191 | 8/1976 | Allen et al. | 156/202 |
| 4,270,963 | 6/1981 | Howat | 156/438 |

*Primary Examiner*—Edward C. Kimlin
*Assistant Examiner*—Louis Falasco
*Attorney, Agent, or Firm*—Donald L. Johnson; John F. Sieberth

[57] ABSTRACT

The edge of an interior lamina or laminae of a laminated sheet or film having three or more laminae is positively encapsulated to protect material enclosed by the laminated sheet or film from contacting and interacting with the edge of the interior lamina or laminae. To encapsulate the interior lamina or laminae, the edge of the laminated sheet or film is heated and the molten outer laminae are mechanically forced out and over the interior lamina or laminae to be covered, thereby positively encapsulating the edge of the interior lamina or laminae.

2 Claims, 3 Drawing Figures

EDGE SEALING OF LAMINATE

BACKGROUND OF THE INVENTION

The present invention is related to laminated or composite structures employing multiple layers of materials such as those commonly used in the packaging field. In particular, the invention is related to laminated structures employing an interior lamina which provides a barrier to the escape of moisture, flavor, and aroma, such as, for example, aluminum foil or certain polymeric material.

Many items are commonly made from laminated structures employing one or more plastic layers and an interior barrier layer. Conventional collapsible tubes used for packaging such products are toothpaste, shaving cream, shampoo, and the like, are made from such laminated structures. Such tubes are usually impact extruded from a slug of metal after which the tube is decorated, capped, filled, and sealed. Many attempts have been made to replace such metal tubes with plastic tubes, foil tubes, and tubes made from laminates of plastic and foil. Many of these attempts have failed since plastic materials commonly do not provide an adequate barrier to loss of moisture, flavor, and aroma from the contents of the tube. Furthermore, foil tubes are subject to corrosive attack due to the chemical composition of a large variety of commercially packaged products. The most common solution to these problems has been to form a tube from a plastic and metal foil laminated material which has an internal layer of plastic to resist chemical attack, the metal foil serving as a barrier lamina to prevent loss of moisture, flavor, and aroma from the finished tube.

However, when the edges of the laminated structure are overlapped to form a seam, the inner edge of the interior lamina is exposed to the contents of the tube and may interact therewith. Therefore, it is desirable to encapsulate the edge of the laminated structure to prevent interaction of the interior lamina or laminae with the contents of the tube.

There are several methods known in the art to accomplish encapsulation of the edge of a laminated sheet or film. One of the most widely employed methods is to apply excessive heat at the seam or edge, forcing a predetermined plastic lamina material to melt and flow over the metal lamina during seaming. Such processes require many stringent conditions during sealing and bonding without assurances that such an encapsulation actually occurs.

Exemplary of the methods of the prior art for encapsulating the edge of a laminated structure to prevent an interior lamina or laminae from reacting with the contents of a container formed from the structure is that shown in U.S. Pat. No. 3,307,738. In this patent, two edges of the laminated structure are overlapped and heat and pressure are applied to cause a reduction in the thickness of the layers and to cause the heat softened thermoplastic layers to flow out and over the edge of the barrier layer or middle layer to form fillets of molten thermoplastic enclosing the respective edges of the barrier layer. These fillets are not only joined together over the edges of the barrier or middle layer but each fillet is pressed into and fused with the corresponding thermoplastic layer of the other lap. Other patents showing encapsulation of the edge of a laminated structure are U.S. Pat. Nos. 3,976,224; 3,575,769; and 3,172,571.

SUMMARY OF THE INVENTION

In accordance with the present invention, there is provided a method and apparatus for encapsulating the edge of an interior lamina or laminae of a laminated sheet or film having at least three laminae including heating an edge of the laminated sheet or film and mechanically forcing the outer laminae over the interior lamina or laminae to encapsulate the edge of the interior lamina or laminae.

DESCRIPTION OF THE PREFERRED EMBODIMENTS

Figure 1:
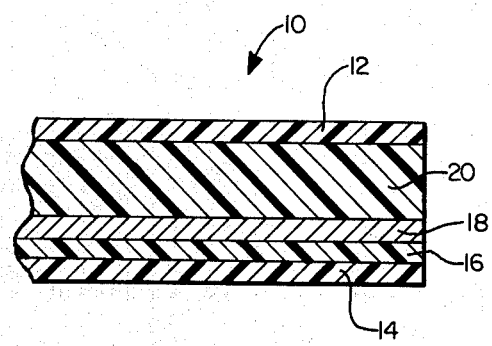
FIG. 1 is a cross-sectional view of a laminated sheet showing the various lamina therein.

Referring now to the drawings, in FIG. 1 is shown a laminated sheet or film generally indicated by the numeral 10. Laminated sheet 10 has two outer lamina, 12 and 14, and three inner or interior lamina 16, 18, and 20. One or more of the inner laminae, 16, 18, and 20, may be a metal lamina such as aluminum foil. Laminated structure 10 can have a minimum of three layers and as large a number as desired.

Figure 2:
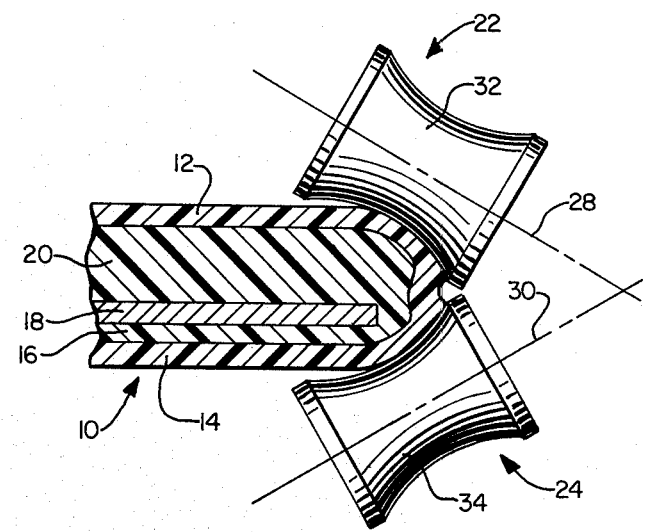
FIG. 2 is a schematic view of a cross-section of the sheet as the sheet contacts the rollers; and, FIG. 3 is a perspective schematic view of a moving laminated sheet being heated and contacted by a roller.
Figure 3:
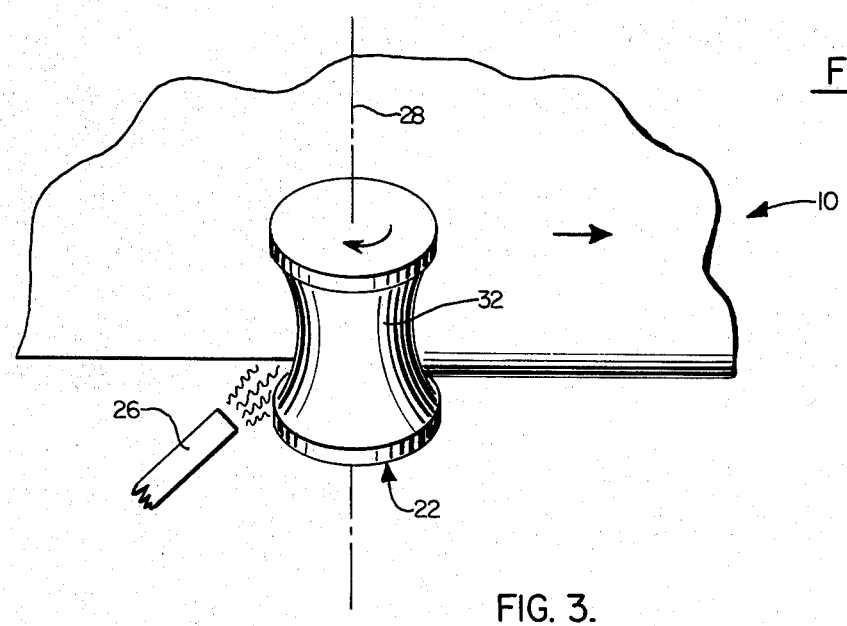

As can be seen in FIGS. 2 and 3, to achieve encapsulation of the edge of the interior laminae 16, 18 and 20, the sheet 10 is moved in the direction indicated by the arrow on sheet 10 in FIG. 3 past a heat source 26 which heats the edge of the thermoplastic laminae to a molten state. The temperature to which the edge is heated will depend upon the particular laminae employed in the laminated sheet 10.

The heated edge of the film is then advanced past the rollers 22 and 24 shown schematically in FIG. 2, only one of the rollers, roller 22, being shown in FIG. 3. Rollers 22 and 24 turn about an axis indicated by the lines 28 and 30 and may be rotated by any conventional means about any conventional axis. The rollers have a concave surface indicated by the numerals 32 and 34 which contact the edge of the inner and outer laminae 12 and 14 after the edges are heated to a molten state. The concave surfaces 32 and 34 mechanically force the molten inner and outer laminae over the edges of the interior laminae 16, 18 and 20, as shown in FIG. 2, to completely encapsulate the inner lamina.

The outer and inner laminae 12 and 14 may be any thermoplastic material which may be heated to a soft molten state. Outer laminae 12 and 14 may be of the same material or may be of different materials. In applications such as toothpaste tubes made from laminated sheets, laminae 12 and 14 may be a thermoplastic material such as polyethylene.

The interior laminae 16, 18 and 20 may be any suitable thermoplastic material which may be heated to a molten state. In toothpaste tube applications laminae 16, 18 and 20 might be a high barrier resin which is resistant to the transmission of fluids and gases. Such materials are disclosed in U.S. Pat. No. 3,426,102 which is hereby incorporated by reference.

If desired, the outer laminae 12 and/or 14 may be made from a barrier resin which is resistant to the transmission of fluids and gases. Exemplary of such materials are those disclosed in U.S. Pat. No. 3,426,102.

It is thought that this invention and many of its attendant advantages will be understood from the foregoing description, and it will be apparent that various changes may be made in the form, construction, and arrangements of the parts without departing from the spirit and scope of the invention, the forms hereinbefore described being merely preferred embodiments thereof.

What is claimed is:

1. An apparatus for encapsulating an exposed edge of an interior lamina or laminae of laminated sheet or film having separate outer thermoplastic laminae on each side of said interior lamina or laminae comprising means for heating the edge of said laminated sheet so that the edges of each of said separate outer thermoplastic laminae are in a molten state and means for forcing the edges of each of said separate outer laminae over the edge of said interior lamina or laminae to encapsulate the edge of said interior lamina or laminae, said means for forcing the edges of each of said outer laminae over the edge of said interior lamina or laminae comprising two roller means which contact said edges of each of said outer laminae and rotate about two axes which intersect, said roller means having concave surfaces which contact edges of each of said outer laminae and force edges of each of said outer lamina over the edge of said interior lamina or laminae to encapsulate the edge of said interior lamina or laminae.

2. The apparatus of claim 1 wherein said apparatus includes means for moving said laminated sheet past said means for heating the edge of said laminated sheet.

* * * * *